United States Patent
Manera (10) Patent No.: US 6,827,035 B2
(45) Date of Patent: Dec. 7, 2004

(54) SELF-REFRESHENING LITTER BOX

(76) Inventor: Jeffrey Manera, 5890 Golden Eagle Cir., Palm Beach Gardens, FL (US) 33418

(*) Notice: Subject to any disclaimer, the term of this patent is extended or adjusted under 35 U.S.C. 154(b) by 43 days.

(21) Appl. No.: 10/266,350

(22) Filed: Oct. 7, 2002

(65) Prior Publication Data

US 2004/0065265 A1 Apr. 8, 2004

(51) Int. Cl.$^7$ .............................................. A01K 29/00
(52) U.S. Cl. ...................................................... 119/166
(58) Field of Search ................................. 119/166, 163, 119/164, 167

(56) References Cited

U.S. PATENT DOCUMENTS

| | | | |
|---|---|---|---|
| 3,071,110 A | * 1/1963 | Fox ............................. | 119/329 |
| 4,801,006 A | 1/1989 | Martin et al. | |
| 4,844,011 A | 7/1989 | Strickland | |
| 5,003,920 A | 4/1991 | Miksitz | |
| 5,048,465 A | 9/1991 | Carlisi | |
| 5,156,640 A | * 10/1992 | Del Rosario ................ | 119/471 |
| 5,188,062 A | 2/1993 | Joy et al. | |
| 5,289,799 A | * 3/1994 | Wilson ........................ | 119/164 |
| 5,381,984 A | 1/1995 | Hindsgual | |
| 5,460,122 A | 10/1995 | Reinartz | |
| 5,592,900 A | * 1/1997 | Kakuta ........................ | 119/164 |
| 5,673,648 A | 10/1997 | Ayle | |
| 6,289,847 B1 | 9/2001 | Carlisi | |

FOREIGN PATENT DOCUMENTS

| | | | | |
|---|---|---|---|---|
| DE | 3534522 | * | 4/1986 | ................. 119/164 |
| FR | 8611303 | * | 2/1988 | ................. 119/164 |

* cited by examiner

Primary Examiner—Son T Nguyen
(74) Attorney, Agent, or Firm—McHale & Slavin, P.A.

(57) ABSTRACT

A self-cleaning litter box assembly for litter using pets, which is capable of providing new litter and disposing of soiled litter for extended periods while minimizing human contact. The apparatus comprises, a receptacle with a receiving area, a central area, and a disposal area, a continuous litter support material, such as a roll of membranous material containing or supporting litter, and a traversing mechanism mounted to the receptacle for advancing the litter support material from the receiving area through the central area and on to the disposal area. Following litter soiling in the central area, the membrane is advanced to a disposable waste receptacle. After the roll of litter support material is completely used, the waste receptacle is disposed of. To renew the system one merely loads a fresh cartridge of litter support material into the device and inserts a new waste receptacle into the disposal area and operation continues.

24 Claims, 5 Drawing Sheets

SELF-REFRESHENING LITTER BOX

FIELD OF THE INVENTION

The invention relates to a self-freshening litter box for litter using pets. More specifically, the device is constructed and arranged to replenish and dispose of soiled pet litter by employing a continuous litter support material, e.g. a roll of membranous material, which unrolls to reveal pet litter distributed thereon. Following litter soiling the membrane is advanced into a waste receptacle while simultaneously providing a fresh litter surface for subsequent use.

BACKGROUND OF THE INVENTION

Domestic pets, for example ferrets, skunks, rabbits, and particularly cats, require the use of a litter box to maintain sanitary conditions in the home. Litter boxes have the disadvantage of producing unpleasant odors when the litter product is not changed on a routine basis. While not limited to a particular litter product, litter products useful in the instant invention may include various clays, wood chips, sawdust, straw, clumping materials, shredded polymers and mixtures thereof.

Used litter also creates health hazards for the occupants in the house.

General practice for most pet owners is to place litter in a plastic box. After an extended period of use by the pet, the pet owner discards the litter. However, many pet owners find it necessary to periodically remove the pet's solid waste from the litter before discarding the entire contents to prevent the pet from tracking the waste out of the box upon its subsequent visits to the litter box.

The changing of soiled litter or manually separating solid waste from the used litter is an unpleasant and undesirable task contributing to the reluctance of pet owners to frequently change the litter. Pet litter not maintained on a routine basis may pose a greater health risk to humans or pets. Insects, such as houseflies, may transfer disease from the animal waste in the litter box to areas contacted by humans.

Toxoplasmosis, an infection of mammals, birds and reptiles, also common to humans and especially dangerous to pregnant women, can be transmitted by breathing contaminated dust particles from litter or handling soiled litter and cat feces during daily maintenance of the litter box.

DESCRIPTION OF THE PRIOR ART

A number of patented devices exist for separating solid waste from litter; some of these devices are automated while others utilize the physical characteristics of the litter to carry out the separation.

U.S. Pat. No. 5,188,062 issued to Joy utilizes a disposable container filled with alternating layers of litter and paper attached to a motorized rotational device. When the litter is soiled the rotational device pulls the paper covered with the soiled litter into a disposable container. During operation, the sides of the disposable container can become errantly soiled. Because the disposable container remains in place for up to 7 days until the container is emptied, it may create an odor and bacteria problem. Additionally, because the litter is not contained, dust from the litter may become airborne when being pulled into or removed via the disposal container, thereby creating additional health hazards.

U.S. Pat. Nos. 5,048,465 and 6,289,847 issued to Carlisi utilize a tray for holding clumping litter. Also included is a rake member which moves laterally along the tray through the litter collecting solid waste. The solid waste is thereafter deposited into a collection module. Pet owners using this device must still replenish litter at the same frequency as a non-automatic litter box. During operation, the rake mechanism contacts waste material and is likely to accumulate residual waste, posing both sanitary and odor disadvantages. In addition, errant soiling of the exposed sides of the box require manual cleaning and create bacterial hazards.

U.S. Pat. No. 5,460,122 issued to Reinartz utilizes a flexible floor mat covered with litter. After the litter is soiled the mat is retracted to a vertical position pushing the litter off the mat into a container below. A hopper mounted above redistributes fresh litter on the mat as it returns to its original position.

During operation, the mat, sidewalls of the box, and the disposal box contact pet waste and may require manual cleaning to avoid odor and bacteria problems. Additionally, because the litter is not contained when being scraped into the disposal container, dust from the litter may become airborne during operation and create additional health hazards.

U.S. Pat. No. 4,844,011 issued to Strickland utilizes a rubber continuous conveyer covered with litter. After the litter is soiled the conveyer rotates and a rubber scraper pushes the soiled litter off the conveyer into a disposal container. Thereafter, a hopper mounted above the conveyer redistributes fresh litter on the conveyor.

During operation of the device, the conveyor and the rake mechanism contact pet waste and are likely to accumulate residual waste, posing both sanitary and odor disadvantages.

U.S. Pat. No. 5,003,920 issued to Miksitz utilizes a litter supply bin mounted above a litter trough. Litter is distributed on the trough by oscillating movement of the supply bin. Continued oscillations of the supply bin push the spent litter in the trough to a collection receptacle. The collection receptacle may include a washing apparatus to spray water into the spent litter and carry the litter and animal waste to a sewer system.

There are many disadvantages associated with this system. Errant soiling and saturated litter in the trough area may create odor and sanitary problems. The design incorporating the washing apparatus requires a water supply and a sewer drain, and therefore lacks portability. In addition, not all types of litters are water-soluble and may create a clogging problem in drains.

Another example of an animal litter device is disclosed in U.S. Pat. No. 5,673,648 issued to Ayle. The device utilizes a bottom tray filled with clumping litter. To separate the solid waste from the unused litter the pet owner attaches a top cover having a waste chute and a slide rail separator. A waste storage bag is attached to the waste chute and the entire device is lifted with a shaking motion. The slide rail diverts solid waste to the storage bag while the unused litter falls through the slide rail for redistribution on the bottom tray.

This device has many shortcomings. To operate the device, the entire litter box must be lifted to separate clumped litter from used litter. In addition to the litter box, extra parts such as the top cover, the chute and slide rail separator come into contact with the soiled litter causing residual soiling and sanitary problems. Lastly, some types of litters may not be as easily separated from clumps of solid waste as others, thereby creating operational difficulties.

U.S. Pat. No. 4,801,006 utilizes a prepacked animal litter box, which contains multiple layers of litter absorbent contained in disposable bags. The bags are set within a cardboard box so that when one bag is used and subsequently discarded, its removal uncovers a succeeding disposable bag of litter. This device requires manual cleaning to maintain sanitary conditions and offers very little advantage over litter poured into a plastic box.

The above noted devices do not provide sufficient odor or bacteria control, and generally require handling of the used litter or manual cleaning of the litter containing area. In addition, many of the devices lack control of dust from the litter that may become airborne and create health hazards for the pet or the pet owner.

Accordingly, there is a need for a self-cleaning device which is capable of manual or automatic operation. The device should protect the owner from exposure to animal waste or contaminated surfaces as well as airborne litter dust.

SUMMARY OF THE INVENTION

The present invention is directed towards a self-freshening litter box assembly for litter using pets, which is capable of providing new litter and disposing of soiled litter for extended periods while minimizing human contact. The apparatus comprises a receptacle with a receiving area, a central area and a disposal area, a continuous litter support material illustrated by, but not limited to a spirally wound roll of membrane material containing litter and a traversing mechanism mounted to the receptacle for advancing the litter support material from the receiving area through the central area and on to the disposal area. The receiving area is constructed and arranged for facilitating the installation of the rotationally mounted roll of litter support material, which, when unrolled, reveals litter in the central area. Following litter soiling in the central area, the membrane is advanced to a disposable waste receptacle, or in the alternative, folded to cover the waste to be compressed by pinch rollers and advanced to a disposable waste receptacle. After the roll of litter support material is completely used, the waste receptacle is disposed of. To renew the system one merely loads a fresh cartridge of litter support material into the device and inserts a new waste receptacle into the disposal area and operation continues.

It is therefore an objective of the present invention to provide a new and improved pet litter system and method for its use. The device includes means for replenishing pet litter while virtually eliminating contact or exposure to soiled litter. The device takes into consideration pet and human hygiene, convenience, reduction of human maintenance, and exposure to unsanitary conditions.

A further objective of the present invention is to provide a pet litter system which can be self-cleaning, and automatically disposes of soiled litter, which is capable of either manual or automatic operation, and which allows for operation over extended periods without human attention.

Yet an additional objective of the present invention is the introduction of replaceable rolls of litter material contained within a linear membrane of folded plastic or other medium designed to integrate with the litter system. Simultaneously, the membrane is advanced, opens to expose the litter, refolds to enclose the used litter, and continues to a disposal container.

A still further objective of the present invention is odor repression with the sanitary disposal of animal waste within an advancing roll of plastic membrane into a disposal container.

Another object of the present invention is to provide a litter box and disposal container that protects the pet and the pet owner from exposure to animal waste, contaminated surfaces and airborne litter dust.

Yet another object of the present invention is to provide a totally renewable litter box that is easy to operate and reload.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
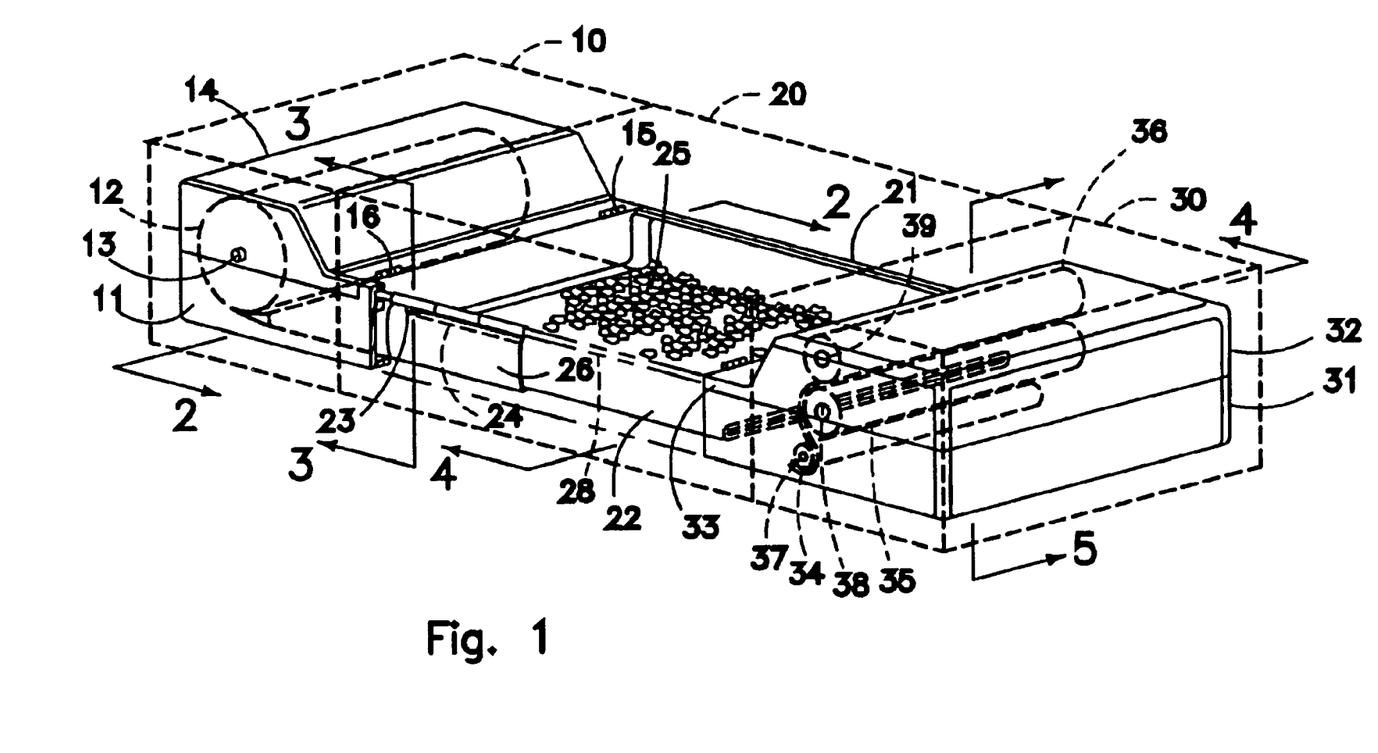
FIG. 1 is a perspective view of the present invention, a portion thereof being broken away.

Now referring to FIG. 1 of the present invention, it can be seen that a litter box 1 capable of automated operation is shown. Located in the receiving area 10 is the receiving module 11, generally rectangular in shape with one open side. Receiving module access means are provided, for example an optional hinged lid 14 pivots around hinges 15 and 16 to allow installation of litter cartridge 12. Receiving module 11 being constructed and arranged to facilitate the installation of litter cartridge 12, rotatably mounted on axis 13.

Located in the central area 20 is the central module 21 suitably attached and in communication with the open side of receiving module 11. The central module 21 is generally channel shaped having a flat bottom surface, two upwardly standing sidewalls and open ends. Within the central module 21 it can be seen that there is an optional floating central member 22 having two upwardly standing sidewalls and a bottom surface. The four upper corners of the upwardly standing sidewalls of floating central member 22 being bent inward for guiding membrane 26.

Figures 3A, 3B:
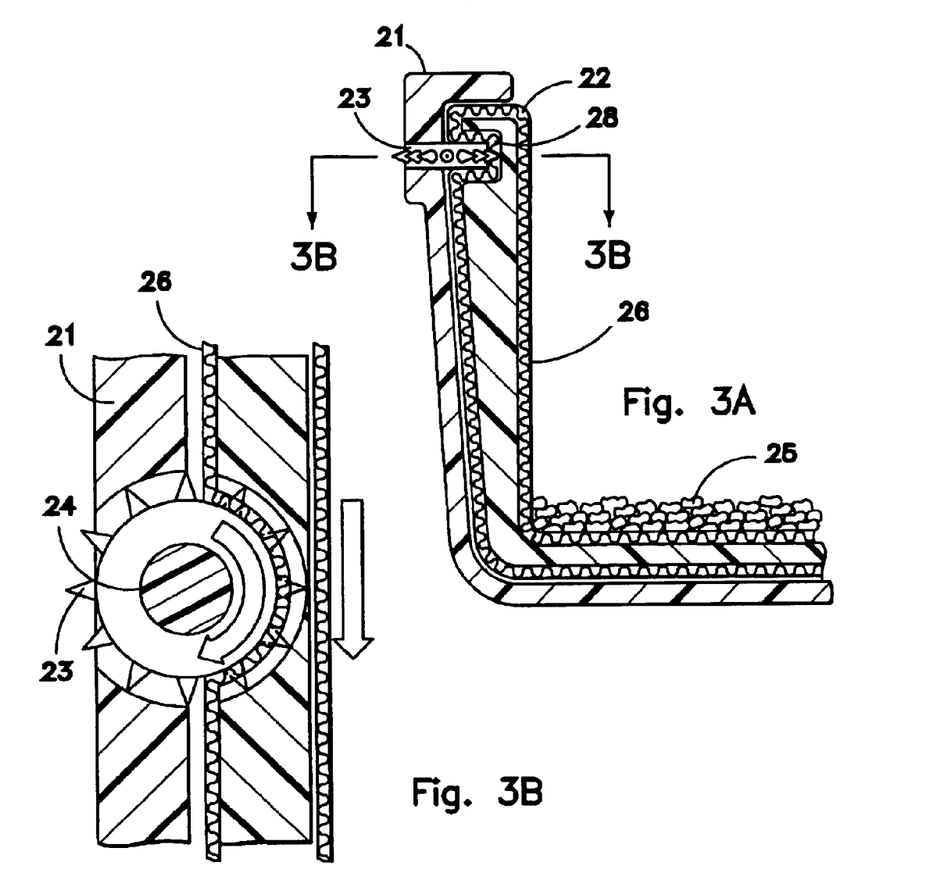
FIG. 3A is a cross sectional view through the central area of the present invention showing a tractor roller in cooperation with the membrane and the floating central member.
FIG. 3B is a longitudinal cross sectional view through a tractor roller in the central area of the present invention further showing the cooperation of the roller and the membrane.

Also located in the central area 20 are means for facilitating traverse of membrane 26. Such means are illustrated by, but not limited to, four tractor rollers 23 rotatably mounted on four roller shafts 24 (FIG. 3B). Two tractor rollers 23 and two roller shafts 24 being located on each sidewall of central module 21.

Figure 5:
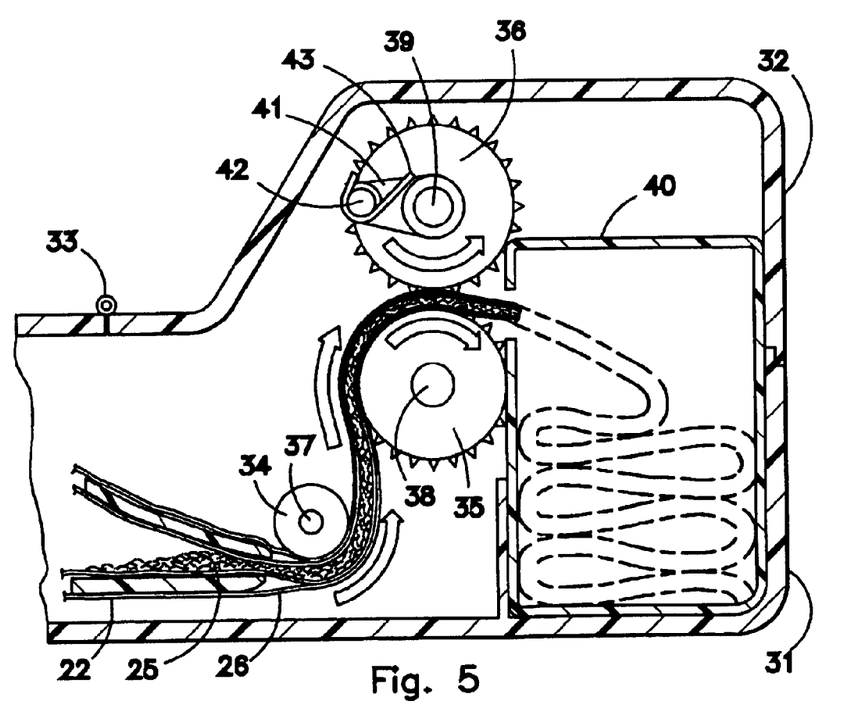
FIG. 5 is a cross sectional view through the disposal area of the first embodiment showing the pinch rollers as well as the path of the membrane as it passes through the pinch rollers to the disposal box.

The disposal area 30 contains the disposal module 31, which is characterized as a compartment that is generally rectangular in shape with one open side. The open side of the disposal module 31 is suitably attached and in communication with the second open end of the central module 21. The disposal module 31 may further include access means, for example in the form of a hinged lid 32 pivoting around hinges 33 and 44 to allow removal of the disposal box 40 (FIG. 5). The disposal module 31 is constructed and arranged to support three pinch rollers 34, 35, and 36 rotatably mounted on roller shafts 37, 38, and 39 respectively (FIG. 5).

Figure 2:
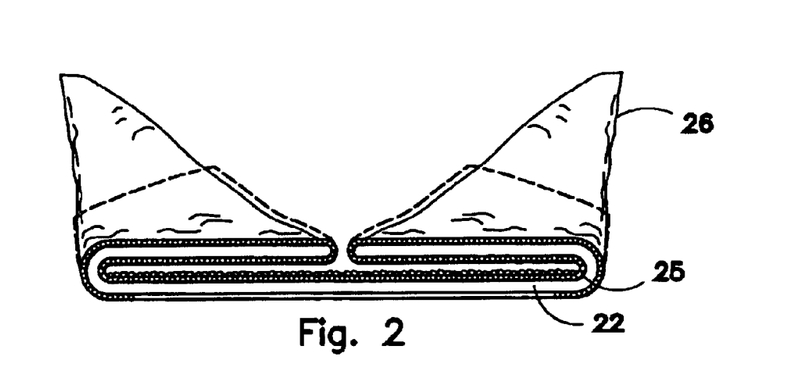
FIG. 2 is a partial cross sectional view through the receiving area of the present invention showing the relationship of the litter within the spooled membrane and the unfolding of the membrane to expose the litter.

Now referring to FIG. 2 it can be seen that the lower surface of the membrane 26 is located juxtaposed to the outer surface of the floating central member 22 so as to allow the membrane 26 to traverse the floating central member 22. The litter 25 is located juxtaposed to and covered by the inwardly folded upper surface of the membrane 26. The upstanding walls of the floating central member 22 being shaped so that as the membrane 26 traverses the floating central member 22, the membrane 26 is unfolded to expose litter 25 before entering the central area 20.

While a particular preferred embodiment has been shown, it is also understood that an absorbent mat may replace either the litter 25 or the combination of the membrane 26 and the litter 25.

Figure 6:
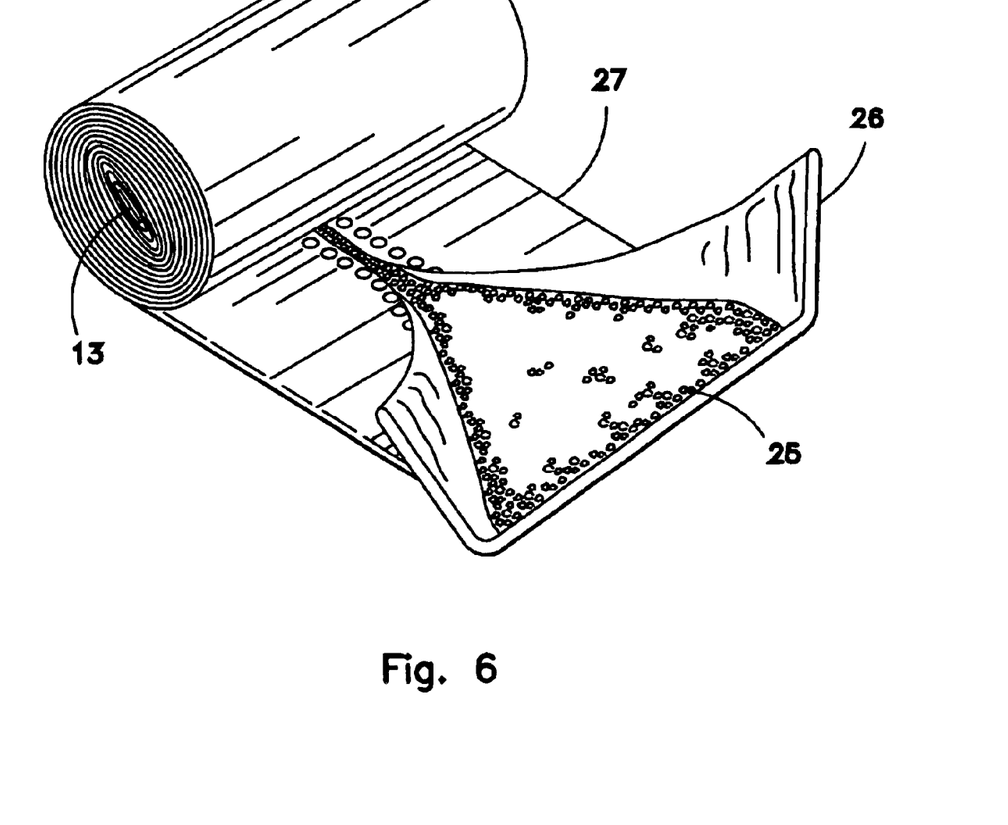
FIG. 6 is a perspective view showing the litter cartridge opening to expose the litter.

FIG. 3A shows one of four locations in the central area 20 (FIG. 1) representative of the typical cooperation between the central module 21, tractor rollers 23 and floating central member 22 for traversing membrane 26. It can be seen that a longitudinal channel 28 located on the upstanding wall of floating central member 22 allows the membrane 26 passing therethrough to be driven by the rotatably mounted tractor roller 23 which is shown having upstanding pins or triangular protrusions on its outer periphery designed to engage optional tracking means, for example tractor openings 27 which are assembled in a linear array (FIG. 6) located adjacent to the outer edges of the membrane 26.

FIG. 3B further shows one of the four locations in the central area 20 (FIG. 1) representing the engaging tangent relationship between the central module 21, tractor rollers 23, roller shafts 24 and floating central member 22 for traversing the membrane 26.

The distance between the engaging tangent relationship of the rollers 23 and the membrane 26 is such that the membrane 26 will not rip or tear as it is traversed. In effect, the distance the tractor rollers 23 should be in adjacent or proximate relationship to the membrane 26 is dependant upon the thickness and shear strength of the membrane material. This relationship can be determined by routine experimentation. The tractor rollers 23 may be made of any suitable material such as rubber, plastic, metal or a combination thereof. In this manner the tractor rollers 23 are able to traverse and regulate the respective speed of the membrane 26 passing therethrough.

The process described above may be driven by hand, via a hand crank 45 or by a geared motor 46 activated and controlled either manually or by sensors and a control unit using means well known to those of ordinary skill in the art. Household current is the preferred energy source for the motor, although other sources such as batteries, a spring driven motor 47, or the like may be used.

Figure 4:
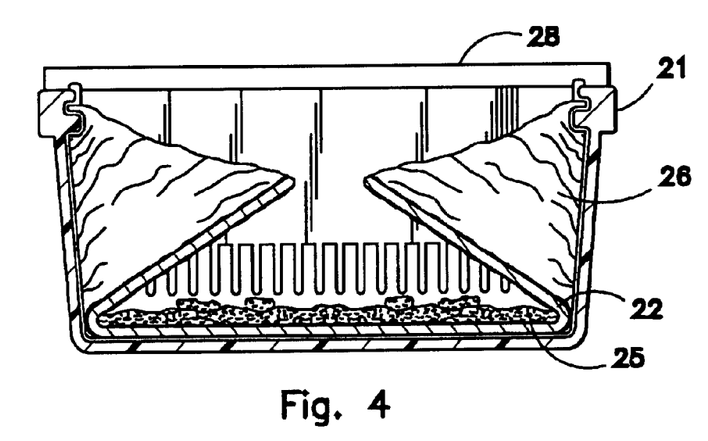
FIG. 4 is a cross sectional view through the central area of the present invention showing the optional disposable rake as well as the path of the membrane as it refolds over the litter.

FIG. 4 represents an end view of central area 20 (FIG. 1) showing the refolding of the membrane 26 as it enters the disposal area 30 (FIG.1). An optional disposable rake 29 is suitably attached and positioned so as to distribute animal waste and litter 25 as membrane 26 transverses. Also shown are the upstanding sidewalls of floating central member 22, the corners of the sidewalls bent inward to allow the membrane 26 to be refolded to cover litter 25 as it traverses into the disposal area 30.

FIG. 5 shows the cooperation of the pinch rollers 34, 35 and 36 with the membrane 26 within the disposal area 30. Pinch roller 34 is rotatably mounted on shaft 37 in a manner that allows it to rotate with the respective speed of the membrane 26 passing therethrough. Pinch roller 35 is a driven pinch roller rotatably mounted on shaft 38 for traversing membrane 26. The spring biased pinch roller 36 is connected to the pivot plate 41 and is rotatably mounted on shaft 39. Pinch roller 36 may either be an idle pinch roller allowing it to rotate with the respective speed of membrane 26 passing therethrough or in the alternative may be a driven roller for traversing membrane 26. The pinch roller 36 is allowed to move upwardly and downwardly against the membrane 26. The pivoting movement of pinch roller 36 is around the pivot point 42 which is spring biased by spring 43. Also shown is the path of membrane 26 as it traverses through disposal area 30. Membrane 26 passes under pinch roller 34, travels upward and over the driving pinch roller 35 as the contents are compacted by pinch roller 36 and it is received into the disposal box 40.

Rollers 35 and 36 are shown having upstanding pins or triangular protrusions on their outer periphery that engage the membrane 26 or the optional tracking means, for example tractor openings 27 which are assembled in a linear array, or any suitable combination thereof. The distance between the engaging tangent relationships of the rollers 35 and 36 to the membrane 26 is such that the membrane 26 will not rip or tear as it is traversed. In effect, the distance the rollers 35 and 36 should be in adjacent or proximate relationship to the membrane 26 is dependant upon the thickness and shear strength membrane material. This relationship can be determined by routine experimentation. The pinch rollers 34, 35 and 36 can be made of any suitable material such as rubber, wood, plastic, metal or any suitable combination thereof.

The process described above may be driven by hand or by a geared motor activated and controlled either manually or by sensors and a control unit using means well known to those of ordinary skill in the art. Household current is the preferred energy source for the motor, although other sources such as batteries, a spring driven motor, or the like may be used.

Figure 7:
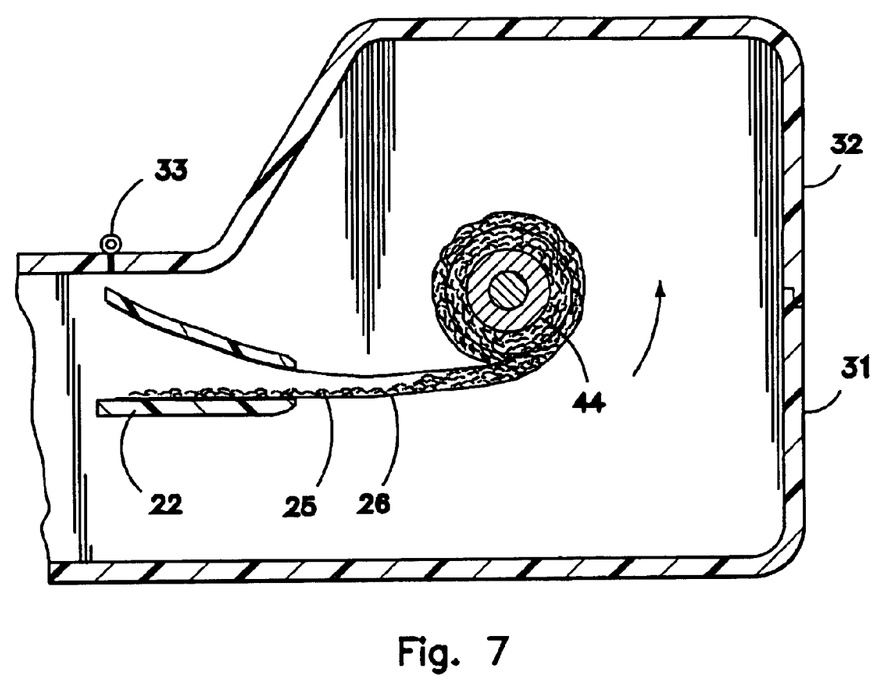
FIG. 7 is a cross sectional view through the disposal area of an alternative embodiment of the present invention showing the path of the membrane as it passes into the disposal area and is spirally wound around an axle member.

FIG. 7 shows an alternative embodiment of the present invention wherein the pinch rollers 35 and 36 are replaced by an axle 44. The axle 44 is a driven member rotatably mounted to the disposal module 31. The axle 44 is constructed and arranged to spirally wind the membrane 26. The axle 44 can be made of any suitable material such as rubber, wood, plastic, metal or any suitable combination thereof. In this manner the axle 44 is able to traverse and regulate the respective speed of the membrane 26 passing through the central area and into the disposal area 30.

The process described above may be driven by hand or by a geared motor activated and controlled either manually or by sensors and a control unit using means well known to those of ordinary skill in the art. Household current is the preferred energy source for the motor, although other sources such as batteries, a spring driven motor, or the like may be used.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A self-freshening animal litter assembly comprising:
    a receptacle having a receiving area, a central area and a disposal area, said receiving area constructed and arranged for supporting a continuous linear sheet of membrane, said disposal area constructed and arranged for receiving used continuous linear sheet of membrane;
    a continuous linear sheet of membrane spirally wound about a central axis and rotatably mounted in said receiving area, said membrane having an upper surface, a lower surface, and outer edges, said outer edges of said membrane being folded inward when in said spirally wound state to enclose a layer of litter product juxtaposed about said upper surface of said membrane;
    a traversing means in mechanical engagement with said receptacle and with said absorption means and constructed and arranged to advance said absorption means from said receiving area through said central area and into said disposal area.

2. The device of claim 1 wherein said litter product is selected from the group consisting of clays, wood chips, sawdust, straw, clumping materials, shredded polymers and mixtures thereof.

3. The device of claim 2 wherein said linear membrane further comprises at least one tracking means parallel and adjacent to said outer edges of said membrane.

4. The device of claim 3 wherein said tracking means further comprises a linear array of tractor openings parallel and adjacent to said outer edges of said membrane.

5. The device of claim 1 wherein said central area of said receptacle further comprises;
    a central module which is generally channel shaped having a flat bottom surface, two upwardly standing sidewalls, a first open end communicating with said receiving area and a second open end communicating with said disposal area, said sidewalls constructed and arranged for unfolding said linear membrane as it traverses into said central area and refolding said linear membrane as it traverses into said disposal area.

6. The device of claim 5 wherein said central area further comprises a floating central member, generally channel shaped having a flat bottom surface and two upwardly standing sidewalls each upwardly standing sidewall including corners which are constructed and arranged for unfolding said linear membrane as it traverses into said central area and refolding said linear membrane as it traverses into said disposal area.

7. The device of claim 5 wherein said traversing means further comprises at least two rotatably mounted tractor rollers in mechanical engagement with said central module, said tractor rollers being constructed and arranged for traversing said linear membrane.

8. The device of claim 7 wherein said tractor rollers have upstanding pins on their periphery for engaging said linear membrane.

9. The device of claim 7 wherein said tractor rollers have triangular protrusions on their periphery for engaging said linear membrane.

10. The device of claim 7 wherein said traversing means further comprises a manually operational means for rotating said tractor rollers.

11. The device of claim 10 wherein said manually operational means further comprises a hand crank for rotating said tractor rollers.

12. The device of claim 10 wherein said manually operational means further comprises a spring motor for rotating said tractor rollers.

13. The device of claim 7 wherein said traversing means further comprises a geared motor activated and controlled by sensors and a control unit for rotating said tractor rollers.

14. The device of claim 13 wherein said geared motor is powered by household current.

15. The device of claim 13 wherein said geared motor is powered by at least one battery.

16. The device of claim 1 further comprising at least two rotatably mounted pinch rollers in mechanical engagement with said disposal area, said pinch rollers being constructed and arranged for traversing and compressing the contents of said used and refolded linear membrane wherein said refolded membrane protects said pinch rollers from soiling.

17. The device of claim 16 wherein said pinch rollers have upstanding pins on their periphery for engaging said refolded linear membrane.

18. The device of claim 16 wherein said pinch rollers have triangular protrusions on their periphery for engaging said refolded linear membrane.

19. The device of claim 16 wherein said traversing means further comprises a manually operational means for rotating said tractor rollers.

20. The device of claim 19 wherein said manually operational means further comprises a hand crank for rotating said tractor rollers.

21. The device of claim 19 wherein said manually operational means further comprises a spring motor for rotating said tractor rollers.

22. The device of claim 16 wherein said traversing means further comprises a geared motor activated and controlled by sensors and a control unit for rotating said tractor rollers.

23. The device of claim 22 wherein said geared motor is powered by household current.

24. The device of claim 22 wherein said geared motor is powered by at least one battery.

* * * * *